United States Patent
Kim et al.

(10) Patent No.: US 9,927,934 B2
(45) Date of Patent: Mar. 27, 2018

(54) FLEXIBLE TOUCH PANEL AND METHOD FOR MANUFACTURING FLEXIBLE TOUCH PANEL

(71) Applicant: Samsung Display Co., Ltd., Yongin-si (KR)

(72) Inventors: Jae Neung Kim, Seoul (KR); Sun Haeng Cho, Hwaseong-si (KR); Ki-Hyun Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/009,209

(22) Filed: Jan. 28, 2016

(65) Prior Publication Data

US 2017/0031484 A1    Feb. 2, 2017

(30) Foreign Application Priority Data

Jul. 28, 2015   (KR) .................. 10-2015-0106427

(51) Int. Cl.
  *G06F 3/041*   (2006.01)
  *G06F 3/044*   (2006.01)

(52) U.S. Cl.
  CPC .... *G06F 3/044* (2013.01); *G06F 2203/04102* (2013.01); *G06F 2203/04103* (2013.01); *G06F 2203/04111* (2013.01); *G06F 2203/04112* (2013.01); *Y10S 977/762* (2013.01)

(58) Field of Classification Search
  CPC .............................. G06F 3/03547; G06F 3/044

USPC ................................................... 345/173–174
See application file for complete search history.

(56) References Cited

U.S. PATENT DOCUMENTS

| | | | | |
|---|---|---|---|---|
| 2012/0268402 A1* | 10/2012 | Wang | ....................... | G06F 3/041 345/173 |
| 2013/0222282 A1* | 8/2013 | Huang | ..................... | G06F 3/044 345/173 |
| 2014/0102764 A1* | 4/2014 | Fujino | ................. | C23C 14/3492 174/250 |
| 2014/0132553 A1* | 5/2014 | Park | ........................ | G06F 3/044 345/174 |
| 2014/0152588 A1* | 6/2014 | Kang | ....................... | G06F 3/041 345/173 |
| 2015/0293646 A1* | 10/2015 | Chen | ........................ | G06F 3/044 345/175 |

FOREIGN PATENT DOCUMENTS

| | | |
|---|---|---|
| KR | 10-1192645 | 10/2012 |
| KR | 10-2014-0028890 | 3/2014 |
| KR | 10-2014-0058895 | 5/2014 |
| KR | 10-2014-0070106 | 6/2014 |
| KR | 10-2014-0078881 | 6/2014 |

* cited by examiner

*Primary Examiner* — Roy Rabindranath
(74) *Attorney, Agent, or Firm* — H.C. Park & Associates, PLC

(57) ABSTRACT

A flexible touch panel includes a touch sensor unit disposed on a flexible substrate. The flexible touch panel includes a transparent conductive layer, a first transparent conductive oxide layer, and a second transparent conductive oxide layer that are sequentially deposited and sequentially contact each other.

9 Claims, 6 Drawing Sheets

FLEXIBLE TOUCH PANEL AND METHOD FOR MANUFACTURING FLEXIBLE TOUCH PANEL

CROSS-REFERENCE TO RELATED APPLICATION

This application claims priority from and the benefit of Korean Patent Application No. 10-2015-0106427, filed on Jul. 28, 2015, which is hereby incorporated by reference for all purposes as if fully set forth herein.

BACKGROUND

Field

Exemplary embodiments relate to a flexible touch panel and a manufacturing method of the flexible touch panel.

Discussion of the Background

A touch panel is an apparatus which recognizes a touch by a pen or a user's finger and has been recently used as a means which is disposed on a display panel, such as an organic light emitting diode display or a liquid crystal display, to input a signal to a display device.

The touch panel includes a substrate and a touch sensor unit which is positioned on the substrate to recognize a touch.

Recently, the substrate has been formed of a flexible film and the touch sensor unit has been formed of metal mesh or silver nanowire (AgNW), and as a result, a touch panel that is entirely flexible has been developed.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible touch panel including a touch sensor unit in which a signal delay may be inhibited and a manufacturing method of the flexible touch panel.

Exemplary embodiments also provide a flexible touch panel in which a touch sensor unit may be inhibited from being visually recognized and a manufacturing method of the flexible touch panel.

Exemplary embodiments further provide a flexible touch panel and a flexible display device including a touch sensor unit in which damage due to stress may be suppressed.

Additional aspects will be set forth in the detailed description which follows, and, in part, will be apparent from the disclosure, or may be learned by practice of the inventive concept.

An exemplary embodiment discloses a flexible touch panel including a flexible substrate and a touch sensor unit positioned or otherwise disposed on a flexible substrate. The touch sensor unit includes a transparent conductive layer, a first transparent conductive oxide layer, and a second transparent conductive oxide layer that are sequentially deposited and sequentially contact each other.

An exemplary embodiment discloses a method of manufacturing a flexible touch panel that includes sequentially depositing and patterning a transparent conductive layer and a first transparent conductive oxide layer on a flexible substrate, and depositing and patterning a second transparent conductive oxide layer on the first transparent conductive oxide layer to form a touch sensor unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
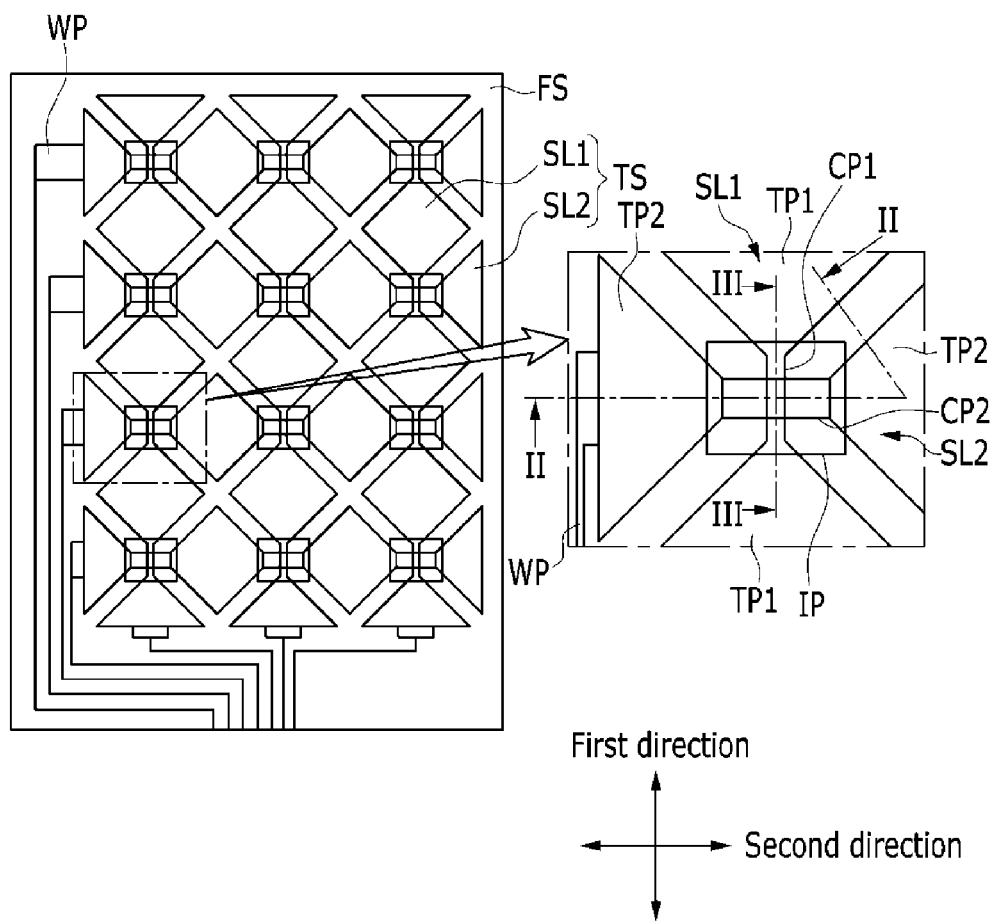
FIG. 1 is a top plan view of a flexible touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
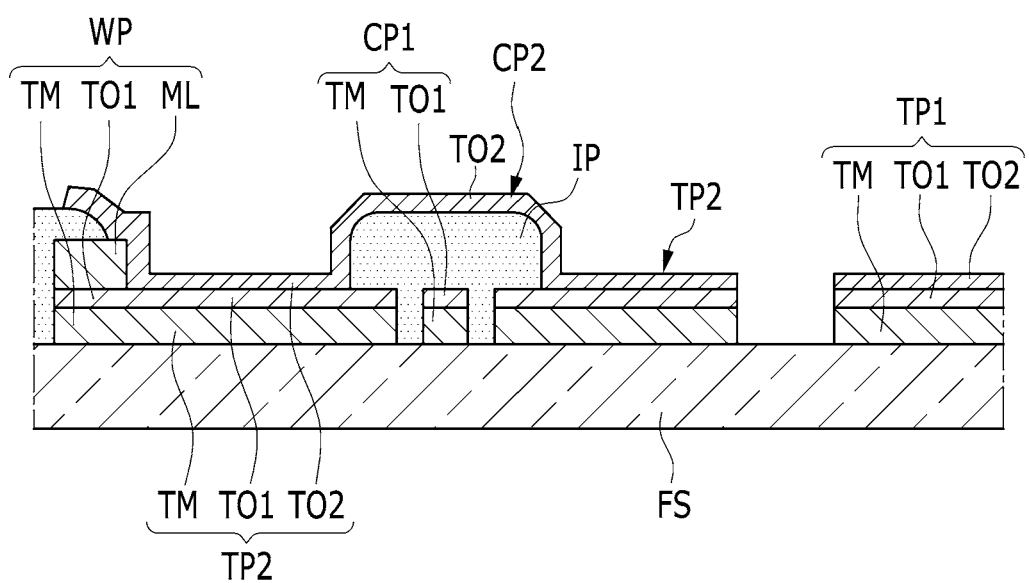
FIG. 2 is a cross-sectional view taken along line II-II of FIG. 1.

FIG. 1 is a top plan view showing a flexible touch panel according to an exemplary embodiment. FIG. 2 is a cross-sectional view taken along line II-II of FIG. 1.

As shown in FIG. 1 and FIG. 2, the flexible touch panel according to an exemplary embodiment recognizes a touch and includes a flexible substrate FS, a wiring portion WP, and a touch sensor unit TS. The flexible touch panel may include a touch controller (not illustrated), in which the touch controller is formed as a flexible printed circuit board (PCB), a printed circuit board (PCB), or the like, and may be connected to the wiring part WP. The touch controller digitizes an electrical analog signal transmitted from the flexible touch panel into a digital signal using a converter and the like to enable a user to calculate touched location information.

The flexible substrate FS is flexible and may include a flexible film. The flexible substrate FS may be an insulating substrate comprising a polymer, glass, stainless steel, or the like. The flexible substrate FS may be flexible, but is not limited thereto, and therefore may be stretchable, foldable, bendable, or rollable. The flexible substrate FS is flexible, stretchable, foldable, bendable, or rollable, such that the whole flexible touch panel may be flexible, stretchable, foldable, bendable, or rollable.

The wiring part WP may be positioned in an outside region of the flexible substrate FS and is connected to the touch sensor unit TS. The wiring part WP may provide a connection between the touch sensor unit TS and the touch controller, and may include opaque conductive materials, such as metal or transparent conductive materials. The wiring part WP may be formed on the flexible substrate FS using the same or a different process from that used to form the touch sensor unit TS.

The wiring portion WP includes a transparent conductive layer TM included in the touch sensor unit TS and a first transparent conductive oxide layer TO1, and further includes a metal layer ML deposited on the first transparent conductive oxide layer TO1. The transparent conductive layer TM and the first transparent conductive oxide layer TO1 will be described later, and the metal layer ML may include at least one metal among gold (Au), silver (Ag), copper (Cu), aluminum (Al), and titanium (Ti).

In an exemplary embodiment, the wiring portion WP includes the transparent conductive layer TM, the first transparent conductive oxide layer TO1, and the metal layer ML. However, in another exemplary embodiment, the wiring portion WP may selectively include at least one among the transparent conductive layer TM, the first transparent conductive oxide layer TO1, and the metal layer ML.

The touch sensor unit TS is a portion that directly recognizes a touch, and may be entirely formed to be transparent. The touch sensor unit TS is positioned on the flexible substrate FS, and may be a capacitive type.

The touch sensor unit TS includes a first signal line SL1, which extends in a first direction on the flexible substrate FS to be connected to the wiring part WP, and a second signal line SL2, which extends in a second direction intersecting the first direction to be connected to the wiring WP.

A plurality of the first signal lines SL1 are provided, and the first signal lines SL1 may each sequentially be disposed in the second direction.

A plurality of the second signal line SL2 are provided, and the second signal lines SL2 may each be sequentially disposed in the first direction.

The first signal line SL1 and the second signal line SL2 intersect each other, and an insulating layer IP is positioned between the first signal line SL1 and the second signal line SL2 so that the first signal line SL1 and the second signal line SL2 intersect each other at a portion where the first signal line SL1 and the second signal line SL2 intersect each other. The insulating layer IP may be formed in a pattern and may include inorganic materials or organic materials, such as silicon oxide ($SiO_x$), silicon nitride ($SiN_x$), or the like.

In the configured flexible touch panel, when a voltage is sequentially applied to the plurality of first signal lines SL1 and the plurality of second signal lines SL2, and charge is filled in the first signal lines SL1 and the second signal lines SL2, respectively, if the first signal line SL1 or second signal line SL2 is touched, a capacitance of the touched first signal line SL1 or second signal line SL2 is changed, such that it may be confirmed which position is touched.

The first signal line SL1 includes a first sensing electrode TP1 and a first connection portion CP1.

A plurality of the first sensing electrodes TP1 are included in one first signal line SL1, and the first sensing electrodes TP1 are respectively separated from each other in the first direction. The first connection portion CP1 respectively connects between the plurality of first sensing electrodes TP1, more specifically, between adjacent first sensing electrodes TP1.

The first sensing electrode TP1 includes a transparent conductive layer TM, a first transparent conductive oxide layer TO1, and a second transparent conductive oxide layer TO2 that are sequentially deposited and sequentially contact each other.

The transparent conductive layer TM is positioned on the flexible substrate FS, and may be a transparent conductive layer including metal. The transparent conductive layer TM includes a metal mesh, a silver nanowire (AgNW), and a copper nanowire (CuNW). Here, the metal mesh is understood to mean a metal pattern layer of a mesh shape, in which a plurality of openings are formed. In addition, the silver nanowire and copper nanowire may respectively have a shape in which the silver nanowire and copper nanowire are respectively dispersed in a base material layer including a resin, in which case the transparent conductive layer TM includes a silver nanowire and the resin layer, or a copper nanowire and the resin layer.

The first transparent conductive oxide layer TO1 is positioned on the transparent conductive layer TM and contacted the transparent conductive layer TM. The first transparent conductive oxide layer TO1 includes a light-transmissive conductive oxide such as indium tin oxide (ITO), indium zinc oxide (IZO), and titanium oxide ($TiO_x$), and it may be formed of a single layer or multiple layers. Alternatively, when the first transparent conductive oxide layer TO1 is formed of multiple layers, a metal layer of a thin film may be interposed between the oxide layers of the multiple layers.

The second transparent conductive oxide layer TO2 is positioned on the first transparent conductive oxide layer TO1 and contacts the first transparent conductive oxide layer TO1. The second transparent conductive oxide layer TO2 covers the entire area of the first transparent conductive oxide layer TO1. Specifically, the second transparent conductive oxide layer TO2 covers about 50% or more of the area of the first transparent conductive oxide layer TO1 that is respectively included the first sensing electrode TP1 and/or the second sensing electrode TP2 and is contacted thereto. The second transparent conductive oxide layer TO2 also covers most of the area of the first transparent conductive oxide layer TO1 included in the first sensing electrode TP1 and/or the second sensing electrode TP2 and contacts such.

The second transparent conductive oxide layer TO2 includes the light-transmissive conductive oxide such as indium tin oxide (ITO), indium zinc oxide (IZO), titanium oxide ($TiO_x$), and it may be formed of a single layer or multiple layers. Alternatively, when the second transparent conductive oxide layer TO2 is formed of multiple layers, the metal layer of the thin film may be interposed between the oxide layers of the multiple layers.

The first connection portion CP1 is positioned between adjacent first sensing electrodes TP1 and may be integrally formed with the first sensing electrodes TP1.

The first connection portion CP1 includes a transparent conductive layer TM and a first transparent conductive oxide layer TO1. The transparent conductive layer TM and the first transparent conductive oxide layer TO1 of the first connection portion CP1 are integrally formed with the transparent conductive layer TM and the first transparent conductive oxide layer TO1 of the first sensing electrode TP1, respectively.

The second signal line SL2 includes a second sensing electrode TP2 and a second connection portion CP2.

The second sensing electrode TP2 included in one second signal line SL2 is provided in a plurality, and the plurality of second sensing electrodes TP2 are separated from each other in the second direction. The second connection portion CP2 respectively connects between the plurality of second sensing electrodes TP2.

The second sensing electrodes TP2 include a transparent conductive layer TM, a first transparent conductive oxide layer TO1, and a second transparent conductive oxide layer TO2 that are sequentially deposited and sequentially contact each other. The transparent conductive layer TM, the first transparent conductive oxide layer TO1, and the second transparent conductive oxide layer TO2 of the second sensing electrodes TP2 are respectively positioned in the same layer as the transparent conductive layer TM, the first transparent conductive oxide layer TO1, and the second transparent conductive oxide layer TO2 of the first sensing electrodes TP1. That is, the second sensing electrodes TP2 are positioned in the same layer as the first sensing electrodes TP1.

The second connection portion CP2 is positioned between adjacent second sensing electrodes TP2, and provides a connection between the adjacent second sensing electrodes TP2.

The second connection portion CP2 is integrally formed with the second sensing electrodes TP2. The second connection portion CP2 includes a second transparent conductive oxide layer TO2. The second transparent conductive oxide layer TO2 of the second connection portion CP2 is integrally formed with the second transparent conductive oxide layer TO2 of the second sensing electrodes TP2. When the second transparent conductive oxide layer TO2 of the second connection portion CP2 is integrally formed with the second transparent conductive oxide layer TO2 of the second sensing electrode TP2, the contact resistance between the second connection portion CP2 and the second sensing electrodes TP2 is minimized.

The second connection portion CP2 has a bridge shape to connect between the adjacent second sensing electrodes TP2 and the adjacent second sensing electrodes TP2 separated from the first connection portion CP1 via the insulating layer IP.

Figure 3:
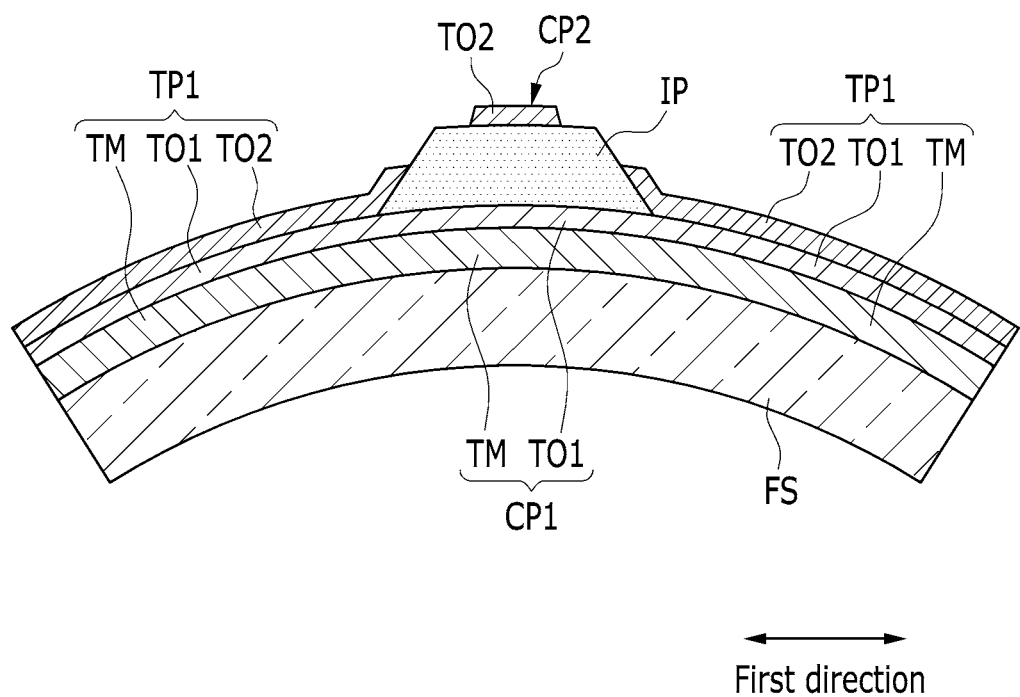
FIG. 3 is a cross-sectional view taken along line of FIG. 1.

FIG. 3 is a cross-sectional view taken along line of FIG. 1.

As shown in FIG. 2 and FIG. 3, the second connection portion CP2 extends in the second direction, crossing the direction that the flexible substrate FS is bent, thereby connecting between the adjacent second sensing electrodes TP2. The extension direction of the second connection portion CP2 may extend in the second direction vertical to the first direction in which the flexible substrate FS is bent. However, the second connection portion CP2 may also extend in any direction crossing the direction that the flexible substrate FS is bent. For example, the angle of intersection between the extension direction of the second connection portion CP2 and the bend direction of the flexible substrate FS may be from 30 to 90 degrees.

The second connection portion CP2 is positioned on the insulating layer IP having the curved surface, and thus the second connection portion CP2 may be curved in the second direction along the curved surface of the insulating layer IP. Because the second connection portion CP2 is curved in the second direction along the curved surface of the insulating layer IP, and because residual stress exists in the several curved portions of the second connection portion CP2, there is a high possibility of damage being generated by the stress when the stress is generated in the second direction. However, because the flexible substrate FS is bent in the first direction and the second connection portion CP2 extends in the second direction crossing the first direction, and because the stress is applied in the first direction to the second connection portion CP2 along the bend of the flexible substrate FS, the second connection portion CP2 may be prevented from being destroyed by the stress.

In addition, because the second connection portion CP2 extends in the second direction crossing the first direction, although stress is generated in the second connection portion CP2 in the first direction along the bend of the flexible substrate FS, the stress is applied to the second connection portion CP2 having a high aspect ratio in the first direction as the transverse direction. Thus, the second connection portion CP2 may be prevented from being destroyed by the stress applied in the first direction.

As described above, in the flexible touch panel according to an exemplary embodiment, the first sensing electrode TP1 of the touch sensor unit TS, the first connection portion CP1, and the second sensing electrodes TP2 respectively include the transparent conductive layer TM, including at least one of the metal mesh, the silver nanowire, and the copper nanowire, and simultaneously includes the flexible substrate FS, thereby improving the overall flexibility.

In addition, in the flexible touch panel according to an exemplary embodiment, because the first sensing electrodes TP1 of the touch sensor unit TS, the first connection portion CP1, the second sensing electrodes TP2 respectively include the transparent conductive layer TM including at least one of the metal mesh, the silver nanowire, and the copper nanowire, even if stress is generated in the flexible touch panel due to the bending of the flexible touch panel, since the metal mesh, the silver nanowire, or the copper nanowire may be easily bent by the stress such that the stress is dispersed in the transparent conductive layer TM itself, although the first sensing electrodes TP1, the first connection portion CP1, and the second sensing electrodes TP2 respectively include the first transparent conductive oxide layer TO1 that is brittle compared to the transparent conductive layer TM, the touch sensor unit TS may be prevented from being damaged by the stress.

Further, in the flexible touch panel according to an exemplary embodiment, the second connection portion CP2 extends in the second direction crossing the first direction that the flexible substrate FS is bent such that, even if stress is generated in the second connection portion CP2 in the first direction along the flexible substrate FS that is bent in the first direction, since the stress is applied to the second connection portion CP2 having the large aspect ratio in the first direction as the transverse direction, the second connection portion CP2 may be prevented from being destroyed by the stress applied in the first direction.

Moreover, in the flexible touch panel according to an exemplary embodiment, the second connection portion CP2 is curved and extends in the second direction along the curved surface of the insulating layer IP. Thus, even if the residual stress exists in the several curved portions of the second connection portion CP2, since the flexible substrate FS is bent in the first direction such that the stress is applied to the second connection portion CP2 in the first direction, the second connection portion CP2 may be prevented from being destroyed by the stress.

That is, a flexible touch panel is provided that inhibits destruction of the touch sensor unit TS by stress.

In addition, in the flexible touch panel according to an exemplary embodiment, the second transparent conductive oxide layer TO2 of the second connection portion CP2 is integrally formed with the second transparent conductive oxide layer TO2 of the second sensing electrodes TP2. Thus, the contact resistance between the second connection portion CP2 and the second sensing electrodes TP2 may be minimized. Accordingly, a flexible touch panel is provided in which the delay of the signal transmitted through the touch sensor unit TS is inhibited.

Furthermore, in the flexible touch panel according to an exemplary embodiment, because the transparent conductive layer TM, the first transparent conductive oxide layer TO1, and the second transparent conductive oxide layer TO2 are sequentially and respectively deposited in the first sensing electrodes TP1 and the second sensing electrodes TP2, and the transparent conductive layer TM, the first transparent conductive oxide layer TO1, and the second transparent conductive oxide layer TO2 are also sequentially deposited in the portion where the first connection portion CP1 and the second connection portion CP2 cross, since an entire refractive index and reflectance of the portion where the first connection portion CP1 and the second connection portion CP2 cross is similar to the entire refractive index and reflectance of the first sensing electrodes TP1 and the second sensing electrodes TP2, the second connection portion CP2 is inhibited from being visually recognized and simultaneously the first sensing electrodes TP1 and the second sensing electrodes TP2 are respectively inhibited from being visually recognized. That is, a flexible touch panel is provided in which the touch sensor unit TS is inhibited from being visually recognized.

Next, a manufacturing method of the flexible touch panel according to another exemplary embodiment will be described with reference to FIG. 4, FIG. 5, and FIG. 6. The above-described flexible touch panel according to an exemplary embodiment may be manufactured by using the manufacturing method of the flexible touch panel according to another exemplary embodiment.

Figure 4:
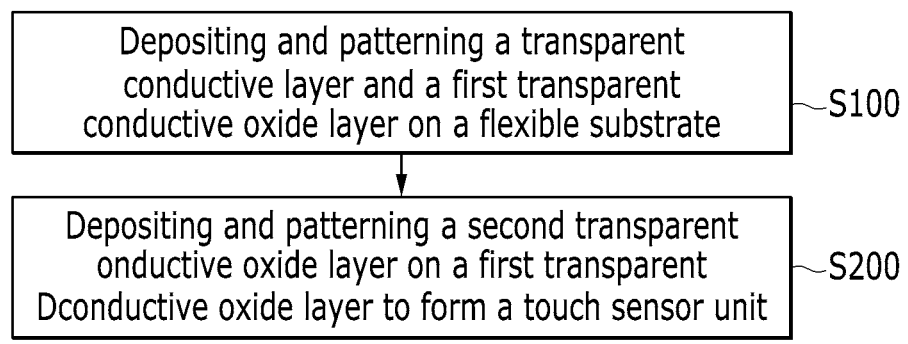
FIG. 4 is a flowchart of a manufacturing method of a flexible touch panel according to another exemplary embodiment.

FIG. 4 is a flowchart of a manufacturing method of a flexible touch panel according to another exemplary embodiment. FIG. 5 and FIG. 6 are cross-sectional views to explain a manufacturing method of a flexible touch panel according to another exemplary embodiment.

Figure 5:
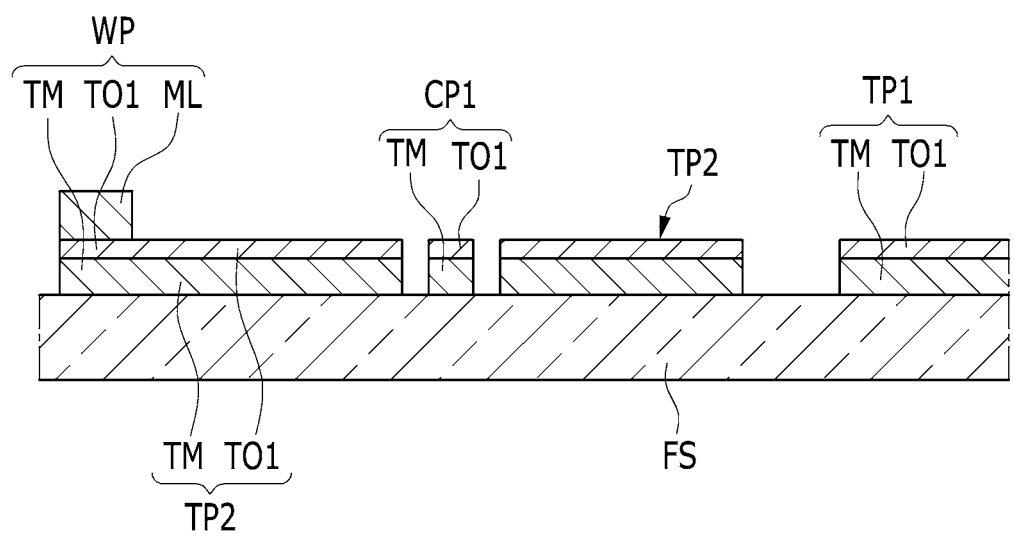
FIG. 5 and FIG. 6 are cross-sectional views illustrating a manufacturing method of a flexible touch panel according to another exemplary embodiment.

First, as shown in FIG. 4 and FIG. 5, a transparent conductive layer TM and a first transparent conductive oxide layer TO1 are sequentially deposited and patterned on a flexible substrate FS (S100).

In detail, first the transparent conductive layer TM, the first transparent conductive oxide layer TO1, and the metal layer ML are sequentially deposited on the flexible substrate FS by a coating process and a sputtering process. Next, the metal layer ML is patterned by using a MEMS process such as a photolithography process using a first mask to form a wiring portion WP. Next, the transparent conductive layer TM and the first transparent conductive oxide layer TO1 are simultaneously patterned by using the MEMS process such as the photolithography process using a second mask to form a first sensing electrode TP1, a first connection portion CP1, and a second sensing electrode TP2 respectively including the transparent conductive layer TM and the first transparent conductive oxide layer TO1.

Figure 6:
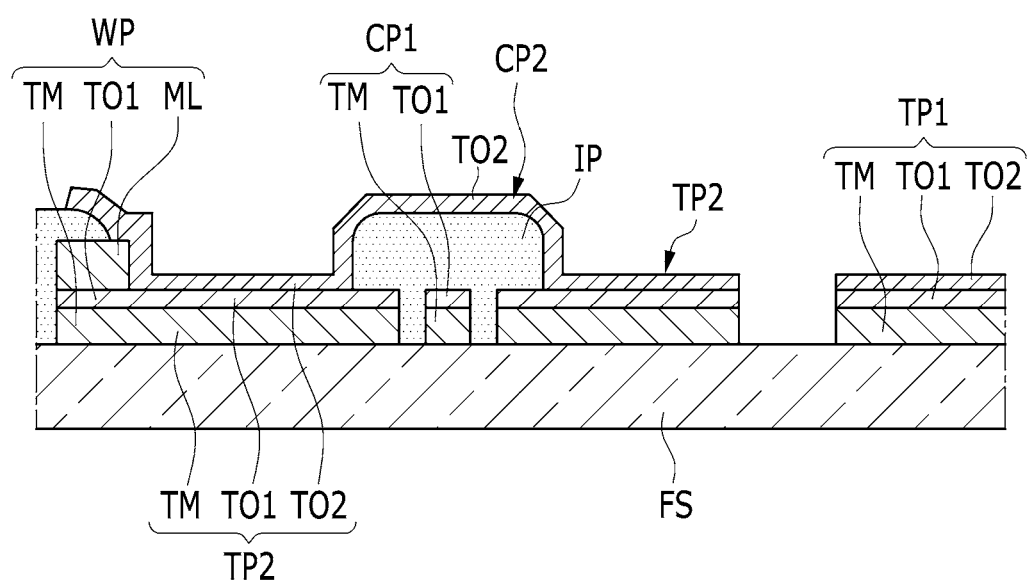

Next, as shown in FIG. 6, a second transparent conductive oxide layer TO2 is deposited and patterned on the first transparent conductive oxide layer TO1 to form a touch sensor unit TS (S200).

In detail, an insulating layer IP is formed on the first connection portion CP1 by using the MEMS process such as the photolithography process using a third mask, and a second transparent conductive oxide layer TO2 is deposited on the insulating layer IP and the first transparent conductive oxide layer TO1. Next, the second transparent conductive oxide layer TO2 is patterned by using the MEMS process such as the photolithography process using a fourth mask to form a first sensing electrode TP1 including the transparent conductive layer TM, the first transparent conductive oxide layer TO1, and the second transparent conductive oxide layer TO2, a second sensing electrode TP2 including the transparent conductive layer TM, the first transparent conductive oxide layer TO1, and the second transparent conductive oxide layer TO2, and a second connection portion CP2 including the second transparent conductive oxide layer TO2.

By the above-described processes, a touch sensor unit TS including the first sensing electrode TP1, the first connection portion CP1, the second sensing electrode TP2, and the second connection portion CP2 and a wiring portion WP including the transparent conductive layer TM, the first transparent conductive oxide layer TO1, and the metal layer ML are formed.

As described above, in the manufacturing method of the flexible touch panel according to another exemplary embodiment, even if the touch sensor unit TS and the wiring portion WP respectively include the plurality of layers, by forming the touch sensor unit TS and the wiring portion WP by using the first mask, the second mask, the third mask, and the fourth mask, the overall manufacturing time and manufacturing cost are reduced. That is, a manufacturing method of the flexible touch panel is provided having reduced manufacturing time and manufacturing cost.

According to an exemplary embodiment, a flexible touch panel including the touch sensor unit in which the signal delay is inhibited and a manufacturing method thereof are provided.

Also provided are a flexible touch panel in which the touch sensor unit is inhibited from being visually recognized and a manufacturing method of the flexible touch panel.

In addition, a flexible touch panel including the touch sensor unit in which damage due to the stress is suppressed and the manufacturing method thereof are provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A flexible touch panel comprising:
a flexible substrate; and
a touch sensor unit disposed on the flexible substrate and comprising a transparent conductive metal layer, a first transparent conductive oxide layer, and a second transparent conductive oxide layer that are sequentially deposited and sequentially contact each other,
wherein the touch sensor unit comprises:
a plurality of first sensing electrodes disposed on the flexible substrate and respectively separated in a first direction;
a first connection portion disposed between and connecting the plurality of first sensing electrodes;
a plurality of second sensing electrodes disposed on the flexible substrate and respectively separated in a second direction crossing the first direction; and
a second connection portion separated from the first connection portion via an insulating layer, the second connection portion disposed between and connecting the plurality of second sensing electrodes, and
wherein:
the first sensing electrodes and the second sensing electrodes respectively comprise the transparent conductive metal layer, the first transparent conductive oxide layer, and the second transparent conductive oxide layer,
the first connection portion consists of the transparent conductive metal layer and the first transparent conductive oxide layer, and
the second connection portion consists of the second transparent conductive oxide layer.

2. The flexible touch panel of claim 1, wherein the transparent conductive metal layer comprises at least one of a metal mesh, a silver nanowire (AgNW), and a copper nanowire (CuNW).

3. The flexible touch panel of claim 1, wherein the first sensing electrodes and the first connection portion are integrally formed.

4. The flexible touch panel of claim 3, wherein the second sensing electrodes are disposed in the same layer as the first sensing electrodes.

5. The flexible touch panel of claim 1, wherein the second transparent conductive oxide layer covers the entire first transparent conductive oxide layer.

6. The flexible touch panel of claim 1, wherein the second transparent conductive oxide layer covers at least about 50% of the first transparent conductive oxide layer.

7. The flexible touch panel of claim 1, wherein the second transparent conductive oxide layer of the second connection portion is integrally formed with the second transparent conductive oxide layer of the second sensing electrodes.

8. The flexible touch panel of claim 1, wherein the second connection portion extends in a direction crossing a direction in which the flexible substrate is configured to bend.

9. The flexible touch panel of claim 1, further comprising a wiring portion comprising a metal layer connected to the touch sensor unit and disposed on the transparent conductive metal layer and the first transparent conductive oxide layer.

* * * * *